(12) United States Patent
Stollman (10) Patent No.: US 9,590,968 B2
(45) Date of Patent: *Mar. 7, 2017

(54) METHODS AND APPARATUS FOR TRANSACTING WITH MULTIPLE DOMAINS BASED ON A CREDENTIAL

(71) Applicant: Jeff Stollman, Chesterbrook, PA (US)

(72) Inventor: Jeff Stollman, Chesterbrook, PA (US)

(*) Notice: Subject to any disclaimer, the term of this patent is extended or adjusted under 35 U.S.C. 154(b) by 530 days.

This patent is subject to a terminal disclaimer.

(21) Appl. No.: 14/027,744

(22) Filed: Sep. 16, 2013

(65) Prior Publication Data

US 2014/0189813 A1    Jul. 3, 2014

Related U.S. Application Data

(63) Continuation of application No. 12/268,069, filed on Nov. 10, 2008, now Pat. No. 8,549,589.

(51) Int. Cl.
*H04L 29/06* (2006.01)
*G06Q 20/10* (2012.01)
*G06Q 20/40* (2012.01)

(52) U.S. Cl.
CPC ............ *H04L 63/08* (2013.01); *G06Q 20/10* (2013.01); *G06Q 20/4014* (2013.01); *H04L 63/0853* (2013.01)

(58) Field of Classification Search
CPC .................................. H04K 1/00; H04L 63/08
See application file for complete search history.

(56) References Cited

U.S. PATENT DOCUMENTS

| 5,521,980 | A | 5/1996 | Brands |
| 5,604,805 | A | 2/1997 | Brands |
| 6,073,106 | A | 6/2000 | Rozen et al. |
| 6,324,645 | B1 | 11/2001 | Andrews et al. |
| 6,463,417 | B1 | 10/2002 | Schoenberg |
| 6,581,059 | B1 | 6/2003 | Barrett et al. |
| 6,718,470 | B1 | 4/2004 | Adams |

(Continued)

FOREIGN PATENT DOCUMENTS

| EP | 1 026 867 A2 | 8/2000 | |
| WO | WO 2008/013525 | 1/2008 | |
| WO | WO2008013525 A1 * | 1/2008 | ............... H04K 1/00 |

OTHER PUBLICATIONS

UK IT Security Evaluation and Certification Scheme Certification Report No. P165, "Sony FeliCa Contactless Smart Card RC-S860", Issue 1.0, Mar. 2002; 27 pages.

(Continued)

*Primary Examiner* — Harunur Rashid
*Assistant Examiner* — Thanh Le
(74) *Attorney, Agent, or Firm* — Cooley LLP (57) ABSTRACT

In one embodiment, a method includes receiving from a credential a credential-owner authentication information associated with an identity of an individual. A issuer validation information associated with an issuer of the credential is also received. The method also includes providing a plurality of options, including a first option associated with a first domain and a second option associated with a second domain mutually exclusive from the first domain. The method also includes sending to a portion of the first domain the credential-owner authentication information and the issuer validation information in response to the first option being selected.

22 Claims, 5 Drawing Sheets

(56) References Cited

U.S. PATENT DOCUMENTS

| | | | |
|---|---|---|---|
| 6,816,965 | B1 | 11/2004 | Moore et al. |
| 6,928,428 | B1 | 8/2005 | De Vries |
| 7,073,195 | B2 | 7/2006 | Brickell et al. |
| 7,249,374 | B1 | 7/2007 | Lear et al. |
| 7,290,138 | B2 | 10/2007 | Freeman et al. |
| 7,299,504 | B1 | 11/2007 | Tiller et al. |
| 7,302,591 | B2 | 11/2007 | Oliver et al. |
| 7,308,706 | B2 | 12/2007 | Markham et al. |
| 7,350,226 | B2 | 3/2008 | Moriconi et al. |
| 7,457,950 | B1 | 11/2008 | Brickell et al. |
| 7,865,959 | B1* | 1/2011 | Lewis .............. G06F 21/6218 726/26 |
| 2002/0083014 | A1 | 6/2002 | Brickell et al. |
| 2003/0120610 | A1 | 6/2003 | Hamber |
| 2003/0163686 | A1 | 8/2003 | Ward et al. |
| 2003/0172090 | A1 | 9/2003 | Asunmaa et al. |
| 2004/0111622 | A1 | 6/2004 | Schoenberg |
| 2004/0128546 | A1 | 7/2004 | Blakley et al. |
| 2004/0205342 | A1 | 10/2004 | Roegner |
| 2005/0066010 | A1 | 3/2005 | Treville |
| 2005/0193204 | A1 | 9/2005 | Engberg et al. |
| 2005/0288939 | A1 | 12/2005 | Peled et al. |
| 2006/0129817 | A1 | 6/2006 | Borneman et al. |
| 2007/0101400 | A1 | 5/2007 | Freeman et al. |
| 2007/0143855 | A1 | 6/2007 | Gilchrist et al. |
| 2007/0226790 | A1 | 9/2007 | Maher et al. |
| 2007/0268922 | A1 | 11/2007 | Dougan et al. |
| 2008/0046984 | A1 | 2/2008 | Bohmer et al. |
| 2008/0066181 | A1 | 3/2008 | Haveson et al. |
| 2008/0080372 | A1 | 4/2008 | Cai et al. |
| 2008/0109871 | A1 | 5/2008 | Jacobs |
| 2008/0133530 | A1* | 6/2008 | Wang .............. G06F 21/6218 |
| 2009/0216725 | A1 | 8/2009 | Yaqub |
| 2010/0116880 | A1 | 5/2010 | Stollman |
| 2010/0122315 | A1 | 5/2010 | Stollman |

OTHER PUBLICATIONS

International Search Report PCT/US2009/63801 issued Jul. 28, 2010.
BBC News | Burgers paid for by mobile phone, Feb. 27, 2007 [Online] Retrieved from the Internet: <URL:http://news.bbc.co.uk/2/hi/technology/6400217.stm> (2 pages).
Japan in Numbers: What do Japanese buy using their cellphones?, Oct. 15, 2006 [Online] Retrieved from the Internet: <URL: www.analytica1st.com/2006/10/what-do-japanese-buy-using-their.html> (1 page).
Gizmodo UK: Purchase Coca-Cola in Japan Using Your Cellphone, Sep. 29, 2006 [Online] Retrieved from the Internet: <URL: http://uk.gizmodo.com/2006/09/29/purchase_cocacola_in_japan_usi.html> (2 pages).
No Bus Ticket? Charge it to my cell phone! | PhoneDog, Dec. 14, 2005 [Online] Retrieved from the internet: <URL: http://www.phonedog.com/2005/12/14/no-bus-ticket-charge-it-to-my-cell-phone/> (1 page).
Sony Global—FeliCa, Overview of FeliCa, What is FeliCa?, [Online] Retrieved from the Internet using archive.org: <URL: http://www.sony.net/Products/felica/abt/index.html> dated Apr. 27, 2006 by archive.org (2 pages).
Sony Global—FeliCa, Overview of FeliCa, What can you do with FeliCa? [Online] Retrieved from the Internet using archive.org: <URL:http://www.sony.net/Products/felica/abt/wht.html> dated Apr. 27, 2006 by archive.org (2 pages).
Sony Global—FiCa, Overview of FeliCa, The FeliCa System, [Online] Retrieved from the Internet using archive.org: <URL: http://www.sony.net/Products/felica/abt/dvs.html> dated May 2, 2006 by archive.org (4 pages).
Sony Global—FeliCa, FeliCa in Use, [Online] Retrieved from the Internet using archive.org: <URL: http//www.sony.net/Products/felica/csy/index.html> dated May 2, 2006 by archive.org (2 pages).
Osaifu-Keitai—Wikipedia, the free encyclopedia, [Online] Retrieved from the Internet: <URL: http://en.wikipedia.org/wiki/Osaifu-Keitai> Apr. 17, 2012 (7 pages).
Edy—Wikipedia, the free encyclopedia, [Online] Retrieved from the Internet: <URL: http://en.wikipedia.org/wiki/edy> Apr. 17, 2012 (3 pages).
FeliCa—Wikipedia, the free encyclopedia, [Online] Retrieved from the Internet: <URL: http://en.wikipedia.org/wiki/felica> Apr. 17, 2012 (7 pages).
Office Action mailed Oct. 12, 2011 for U.S. Appl. No. 12/268,065, filed Nov. 10, 2008.
Office Action mailed May 25, 2011 for U.S. Appl. No. 12/268,065, filed Nov. 10, 2008.
Office Action mailed Jul. 19, 2012 for U.S. Appl. No. 12/268,065, filed Nov. 10, 2008.
Office Action mailed Sep. 13, 2012 for U.S. Appl. No. 12/268,069, filed Nov. 10, 2008.
Office Action mailed Dec. 21, 2011 for U.S. Appl. No. 12/268,069, filed Nov. 10, 2008.

* cited by examiner

| Individual 310 | Credential 320 | Domain 330 | Privileges 340 |
|---|---|---|---|
| A | Q | X | Q1 |
| A | R | X | R1 |
| B | S | X | S1 |
| A | Q | Y | Q2 |
| A | R | Y | Q2 |
| B | S | Y | S2 |
| A | Q | Z | Q3 |
| A | R | Z | R3 |
| B | S | Z | S3 |

FIG. 8

METHODS AND APPARATUS FOR TRANSACTING WITH MULTIPLE DOMAINS BASED ON A CREDENTIAL

CROSS-REFERENCE TO RELATED APPLICATIONS

This application is a continuation of and claims priority to U.S. application Ser. No. 12/268,069, filed Nov. 10, 2008, entitled "Methods and Apparatus for Transacting With Multiple Domains Based on a Credential," now U.S. Pat. No. 8,549,589, which is incorporated herein by reference in its entirety.

BACKGROUND

Embodiments relate generally to transactions related to multiple domains, and, in particular, to methods and apparatus for transacting with multiple domains based on a credential.

For decades government and private institutions have created cards (or similar credentials) to establish privileges of card holders. The creator of the card can be referred to as a credential issuer. For example, a driver's license can be used as evidence that an individual has a right to operate a motor vehicle. A membership card can be used by members of a country club to obtain access to a golf course. An employee badge can be used to provide evidence of employment and often can be necessary to gain access to the employer's facilities.

Often these cards are paper cards that include various information that the credential issuer believes necessary to authenticate that the card holder is the person to whom the privileges are issued, as well as to authorize the card holder's access to the privileges. Sometimes, mere possession of the card is considered sufficient to prove a particular privilege (e.g., authorization to drive a particular vehicle, use a particular facility) that may also be specified on the card. With some cards, personal information such as height, weight, hair color, eye color, and photographs of the card holder are included on the card to support the authentication that the bearer of the card is, indeed, the person to whom the card was issued and to whom specified privileges have been granted.

As electronic technology evolved, credential issuers began issuing cards that included electronic capabilities such as magnetic strips and, now, even microchips configured to store information. This expanded electronic capability has, for example, provided an additional place to store identifying information that can be accessed during the authentication process and/or information that can be used to expose a forged card. Electronics also allow for storage of more granular levels of authorization than could be included on a convenient wallet-sized paper card. And finally, electronic components now enable both authentication and authorization to be performed remotely. For example, by sliding a card through a card reader, access can be granted to sites, rooms, computers, and even applications without physical inspection by a guard.

Through this evolution from the simple paper card to the "smart-card," however, the identity card process has not changed. Credential issuers have continued to put both various authentication and authorization information on the card. Other than the infrastructure of card readers and computers to interpret the information held on the card, the paper-based identity-card model has remained unchanged.

Though the use of electronics holds the promise of improving our access to services and simplifying the way we gain access to services today, using the paper-based paradigm in the "information age" is reaching its limit. The shortcomings of the paper-based model include at least the following:

1. Cards are designed as single-application stovepipes and are not interoperable. This implies that individuals may need to carry many cards to access multiple services/locations. Under the known architectures an individual may be required to possess separate cards for driver's license, passport, credit cards, and employee ID. For example, government contractors may need multiple badges for federal agency access (under Homeland Security Presidential Directive-12) and for working as a guest at the facilities of teammates. First Responders are required to obtain identity cards under the Department of Homeland Security First Responder Access Credential program. And because each state may roll out its own program with its own card design, a utility worker in Tennessee may need a separate card to support disasters in each of his neighboring states. And since some disasters draw First Responders from beyond their neighboring states, individuals might also need cards from dozens of other states that require outside support.

2. Current information requirements for most smart-card programs include transient information which is costly to maintain. Updating/reissuing cards based on changes can become an expensive and onerous process. For example, a person's mailing address, which can be a common field included on many ID cards, can change frequently and trigger re-issuance of a card with each address change. Even the most common data field—the cardholder's name—is subject to change through marriage, divorce, or the simple desire to change one's name to "Bono" or "Sting."

3. Privileges can change rapidly, but cards can't. For example, if a government contractor is fired while away from his office, it may take the employer several days to retrieve the government contractor's ID badge. Although electronic access to company systems by the government contractor may be disabled relatively quickly, disabling access to the government agency could be a manual process that could be delayed for several days until, for example, appropriate government agency authorities are notified that the government contractor was fired. As another example, the granting of additional privileges such as access to a secure room or updating an employee's card to reflect an increased security status could require significant time and cost.

4. The disclosure of personal information in an easy-to-read electronic form can result in an abuse of private information. The abuse of private information included on a card can be a significant concern. For example, information included on a card may be accessed and used to impersonate the card owner (e.g., impersonate the card owner in an on-line transaction (identity theft)), to discriminate against the card owner, and/or to access other information that could be damaging to a person's reputation and/or credit.

Thus, there is a need for methods and apparatus for transacting with multiple domains that could be independent of a credential issuer based on a credential.

SUMMARY

In one embodiment, a method includes receiving from a credential a credential-owner authentication information associated with an identity of an individual. An issuer validation information associated with a credential issuer is also received. The method also includes providing a plurality of options, including a first option associated with a first domain and a second option associated with a second domain mutually exclusive from the first domain. The method also includes sending to a portion of the first domain the credential-owner authentication information and the issuer validation information in response to the first option being selected.

DETAILED DESCRIPTION

A domain associated with an entity (e.g., an individual, a business, an organization, an agent (e.g., a human agent, an electronic agent) of an individual/business/organization) can be accessed by an individual using a credential via a terminal device. Specifically, the credential can include credential data, such as credential-owner authentication information associated with the individual and/or credential-issuer validation information associated with the issuer of the credential. The credential-owner authentication information and the credential-issuer validation information can be used in an authentication operation. The terminal device can be configured to receive credential data from the credential and to use the credential data as part of an authentication operation. In some embodiments, the credential can be a token.

In some embodiments, privilege data representing privileges associated with the individual can be received (e.g., retrieved) from a privilege database based on credential data from a credential. In some embodiments, the privilege data can be associated with a particular domain or multiple domains. Accordingly, the credential data from the credential can be used to access one or more domains. In some embodiments, the domains can be independent (e.g., mutually exclusive) domains. In some embodiments, the privilege data can be distributed and accessed via one or more domain based on credential data from a credential. In some embodiments, the credential can be referred to as a universal credential because it can be used to access multiple domains.

In some embodiments, the terminal device can be configured to display to the individual one or more transaction options associated with one or more domains and/or one or more information sources. In some embodiments, the terminal device can be configured to communicate with (e.g., exchange information with) an information provider associated with one or more domains and/or one or more information sources.

In some embodiments, the terminal device can be configured to authorize the release of confidential information (e.g., personal information) associated with the individual to a relying party (such as a retailer) after the relying party and/or the individual has been authenticated. In some embodiments, the identity validation process can be based in part on supplemental authentication information (e.g., personal identification information) received from the individual. In some embodiments, the terminal device can be configured to compare the received supplemental authentication information with a portion of the credential-owner authentication information to authorize transmission of personal information associated with the individual to the relying party. In some embodiments, the individual can be referred to as a credential holder or as a token holder.

Figure 1:
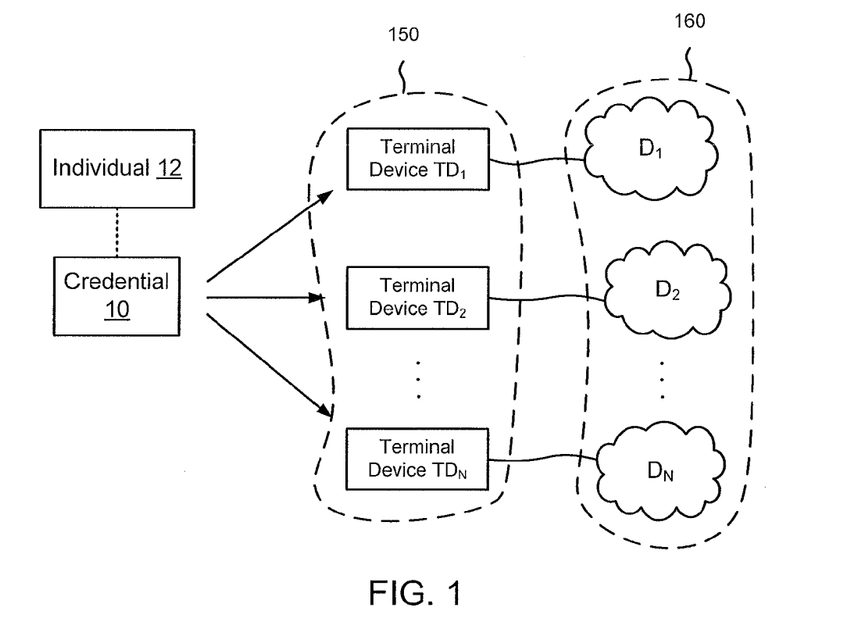
FIG. 1 is a schematic block diagram that illustrates multiple terminal devices associated with multiple domains, according to an embodiment.

FIG. 1 is a schematic block diagram that illustrates multiple terminal devices associated with multiple domains, according to an embodiment. Specifically, FIG. 1 illustrates terminal devices $TD_1$ through $TD_N$ associated with domains $D_1$ through $D_N$, respectively. The terminal devices $TD_1$ through $TD_N$ can collectively be referred to as terminal devices 150.

As shown in FIG. 1, one or more of the terminal devices 150 can be configured to receive credential data from a credential 10 associated with an individual 12. In some embodiments, the credential 10 can include credential-issuer validation information that can be used to determine an authenticity of the credential and/or credential-owner authentication information that can be used to authenticate (e.g., validate) an identity of the individual 12. In some embodiments, the credential-issuer validation information can include information that can be used to determine (e.g., verify, authenticate) the pedigree of the credential such as the name of the issuer (e.g., credential service provider), the date of issuance of the credential, certification level of the issuer of the credential, and/or various other information about the process or level of trust associated with the process used by the issuer to issue the specified credential.

In some embodiments, the credential 10 can be an object (e.g., a physical object) that has one or more modules configured to send information to at least one of the terminal devices 150. In some embodiments, the credential 10 can be a card that includes, for example, a module configured to emit a wireless data signal, a magnetic strip, and/or a barcode. In some embodiments, the credential 10 can be or can include one or more radio frequency modules (e.g., a microchip) associated with (e.g., included in, on, embedded within, coupled to, disposed within) an object such as a mobile electronic device (e.g., a mobile telephone), a watch, a piece of jewelry, an item of clothing, a keychain, and/or other portable item.

The terminal device $TD_1$ can be configured to perform at least a portion of an authentication operation based on the credential data received from the credential 10 associated with the individual 12. Specifically, the credential data received from the credential 10 can be used to determine the authenticity of the credential 10 and/or to authenticate the identity of the individual 12 at one or more of the terminal devices 150 and/or at one or more of the domains 160. For example, credential data can be received at terminal device $TD_1$. Terminal device $TD_1$ can be configured to send the credential data to a domain $D_1$ where the credential data can be used to determine the authenticity of the credential 10 and/or to authenticate the identity of the individual 12.

In some embodiments, the terminal device $TD_1$ can be configured to display information to and/or receive secondary personal identification information from the individual 12. In some embodiments, the personal identification information can be used to authenticate the identity of the individual 12 in addition to the credential-owner authentication information. In some embodiments, the terminal device $TD_1$ can be included in (e.g., a component part of) the domain $D_1$. In some embodiments, at least a portion of the credential-owner authentication information can be (or can include) a personal identification number (PIN), a digital certificate, and/or information related to a characteristic of the individual 12 (e.g., biometric information).

In some embodiments, the terminal device $TD_1$ can be any type of device (e.g., physical device) configured to receive information (such as credential data) from the credential 10. For example, the terminal device $TD_1$ can be and/or can include a computer kiosk, a contact reader (e.g., a magnetic card reader), a wireless card reader, and/or a contactless card reader (e.g., an Radio-Frequency Identification (RFID) card reader). In some embodiments, the terminal device $TD_1$ can be configured to receive information from the credential 10 via a card swipe (if the credential 10 is a card), a bar code scan (if the credential 10 includes a bar code), and so forth. In some embodiments, the terminal device $TD_1$ can be configured to communicate (e.g., exchange information) with the credential 10 via an RFID signal, a wireless transfer protocol such as Bluetooth, a wireless USB protocol, an Ultrawide Band (UWB) signal, a signal encoded using optical or infrared radiation, a cellular telephone network, a wireless computer network, and so forth. In some embodiments, the terminal device $TD_1$ can be configured to receive data input from the individual 12 via an input device such as a touch screen, a computer keyboard, a computer mouse, or other data input device.

In some embodiments, the terminal device $TD_1$ can be further configured to grant and/or deny one or more portions of the request of the individual 12 associated with the credential 10 based on success/fail result information associated with an authentication operation. In some embodiments, the terminal device $TD_1$ can be configured to send credential data received from the credential 10 to the domain $D_1$ during performance of a portion of the authentication operation of the credential 10 associated with the individual 12. In some embodiments, the terminal device $TD_1$ can be further configured to receive authentication operation success/fail result information from the domain $D_1$ when the authentication operation is performed at the domain $D_1$. In some embodiments, the terminal device $TD_1$ can be configured to grant and/or deny one or more portions of the request of the individual 12 based on the received authentication operation results.

After an authentication process has been performed based on the credential 10, the individual 12 can trigger a transaction associated with one or more of the terminal devices 150 and/or one or more of the domains 160. In some embodiments, the terminal device $TD_1$, for example, can be configured to execute one or more operations related to a transaction that can be initiated by the individual 12. The terminal device $TD_1$ can be configured to grant the individual 12 associated with the credential 10 access to initiate an operation at the terminal device $TD_1$ as part of a transaction.

Examples of transaction types that can be initiated by the individual 12 include financial transactions, confidential information access transactions, location access transactions (to a protected location or resource), and so forth. In some embodiments, for example, the terminal device $TD_1$ can be configured to provide a user interface (e.g., a graphical user interface) that can be used by the individual 12 during one or more portions of a transaction. In some embodiments, one or more of the functions associated with the transaction can be disposed within the domain $D_1$.

In some embodiments, one or more of the domains 160 can be configured to exchange credential data and/or information associated with the execution of a transaction with at least one of the terminal devices 150. In some embodiments, the information associated with the execution of a transaction can be referred to as transaction-related information. In some embodiments, the domain $D_1$ can be configured to execute at least a portion of an operation associated with the credential 10 and the individual 12, such as an operation associated with the transactions mentioned above.

In some embodiments, the domain $D_1$ can include one or more processing devices (not shown) that can be in communication such that they define a network. The one or more processing devices can be associated with a single entity or group of affiliated entities. For example, the domain $D_1$ can include one or more computerized devices such as a networked computer server. In some embodiments, the domain $D_1$ can be in communication with a terminal device $TD_1$ via a wired link and/or a wireless link. In some embodiments, the domain $D_1$ can include personal identification information used to authenticate the individual 12 using the credential 10. In some embodiments, the domain $D_1$ can include, for example, terminal device $TD_1$ as part of the domain $D_1$.

In some embodiments, the individual 12 can be a human being (e.g., a unique human being). In some embodiments, the individual can be a group of human beings associated with one another through, for example, a common level of access, a group affiliation, or another shared characteristic (e.g., common ownership of an account by an individual and/or institution).

In some embodiments, the credential 10 can be configured to send credential data to the terminal device $TD_1$ during an authentication operation. In some embodiments, the credential 10 can be configured to send credential data to the terminal device $TD_1$ such that the individual 12 and/or the credential 10 can be authenticated based on an authentication operation. In some embodiments, the credential 10 can be configured to send credential data to the terminal device $TD_1$ during execution of at least a portion of a transaction. It should be understood that although many of the above examples relate to terminal device $TD_1$ and domain $D_1$, the examples could be applied to any of the terminal devices 150 and/or to any of the domains 160.

Figure 2:
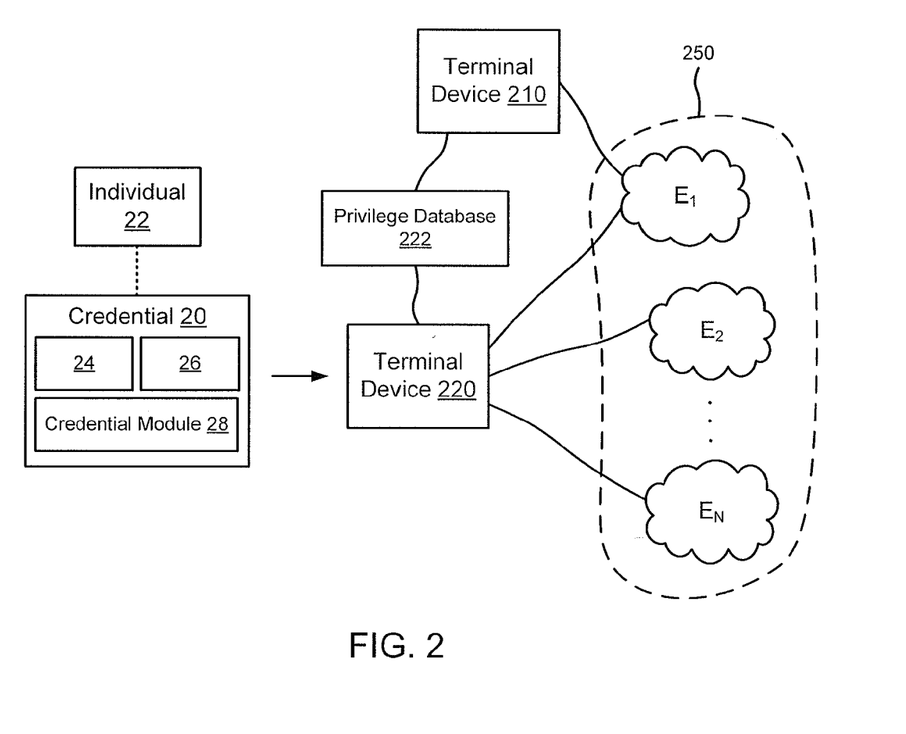
FIG. 2 is a schematic block diagram that illustrates multiple terminal devices associated with multiple domains, according to an embodiment.

FIG. 2 is a schematic block diagram that illustrates multiple terminal devices associated with multiple domains, according to an embodiment. Specifically, FIG. 2 illustrates terminal device 210 and terminal device 220 in communication with a privilege database 222, terminal device 210 in communication with domain $E_1$, and terminal device 220 in communication with domains $E_1$ through $E_N$, according to an embodiment. The domains $E_1$ through $E_N$ can collectively be referred to as domains 250. As shown in FIG. 2, the credential 20, which is associated with individual 22, includes credential-issuer validation information 24 and credential-owner authentication information 26. The credential-issuer validation information 24 and the credential-owner authentication information 26 can be referred to as credential data.

In some embodiments, the credential 20 can be an object used by the individual 22 to authenticate its identity and the identity of the individual 22 so that the individual 22 can initiate a transaction of a particular transaction type (e.g., a financial transaction, a request for access to a physical location, a request to access information, a transmission of proof of age, a transmission of proof of identity, etc.). In some embodiments, the credential-issuer validation information 24 can be a digital certificate included (e.g., on, embedded within, coupled to, disposed within) in a memory (not shown) such as a read-only memory (ROM) and/or a flash memory. In some embodiments, the credential-owner authentication information 26 can include a digital certificate included (e.g., on, embedded within, coupled to, disposed within) in the memory (or in a different memory (not shown)).

In some embodiments, the credential-owner authentication information 26 can include supplemental authentication information (e.g., biometric data, thumbprint data, a PIN) associated with the individual 22 and/or the credential issuer. In some embodiments, supplemental authentication information can be used to, for example, verify the identity of the individual 22. In some embodiments, the supplemental authentication information can be compared by the terminal device 210 with information received at the terminal device 210 from the individual 22 (e.g., a username and/or password, a PIN, biometric information) as part of an authentication operation.

In some embodiments, the credential 20 can include a credential module 28 that includes hardware and/or software configured to send credential data such as credential-owner authentication information 24 and/or credential-issuer validation information 26 to the terminal device 210. In some embodiments, the credential module 28 can be configured to determine whether or not the credential data should be transmitted from the credential 20 to, for example, terminal device 220.

As shown in FIG. 2, terminal device 210 is in communication with domain $E_1$. Although not shown, in some embodiments, terminal device 210 can be associated with one or more of the domains 250 (e.g., a company, a government entity, a living quarters, etc.). In some embodiments, the terminal device 210 can be configured to receive the credential data (e.g., credential-issuer validation information 24 and/or credential-owner authentication information 26) from the credential 20 associated with the individual 22.

In some embodiments, the terminal device 210 can be configured to send the credential data to the privilege database 222 (or a processor (not shown) associated with the privileged database 222) as part of a request for privilege data associated with (e.g., pertaining to) the individual 22. In some embodiments, the terminal device 210 can be configured to receive privilege data associated with the individual 22 from the privilege database 222. The privilege data can include, for example, a list of privileges granted to the individual 22 associated with access to a resource (e.g., a physical location, an object, confidential information, etc.) or authorization (e.g., rights) to initiate a transaction (e.g., a financial transaction).

In some embodiments, the terminal device 220 can be configured to define and send an authentication status signal (e.g., an authentication success indicator, an authentication failure indicator) to the credential 20. In some embodiments, the terminal device 220 can be configured to display an authentication status indicator. For example, the terminal device 220 can be configured to display an authentication status indicator at a user interface such as a graphical user interface, by illuminating a colored indicator light, producing an audible indicator, and so forth. In some embodiments, the terminal device 220 can be configured to send an authentication status signal to one or more of the domains 250 and/or a signal configured to cause one or more of the domains 250 to execute a task in response to the status signal. The task can be, for example, to unlock a door, execute a withdrawal from a bank account associated with the domain, open or close a turnstile, or return requested information.

As shown in FIG. 2, the privilege database 222 is associated with terminal device 210 and terminal device 220. In some embodiments, for example, the privilege database 222 can be configured to receive a signal from the terminal device 210 that includes a request for privilege data associated with the individual 22. In some embodiments, the request for privilege data can include credential data associated with the individual 22 and/or the issuer of the credential. In some embodiments, the privilege database 222 can be configured to send privilege data associated with the individual 22 and/or the credential issuer to the terminal device 210.

In some embodiments, the privilege database 222 can include entries (e.g., one or more digital records) that represent privilege data and/or authentication information. In some embodiments, the privilege database 222 can include entries that represent personal information associated with the individual 22 (e.g., mailing address, physical characteristics, etc.) in addition to privilege data and/or authentication information. The privilege data, authentication information, and/or personal information can be changed by a system administrator or other individual associated with the privilege database 222, when necessary. Thus, the need for issuance of a new credential to the individual 22 can be avoided. This physical separation (from the credential 20) of privilege data, authentication information, and/or personal information associated with the individual 22 can result in greater efficiency than models where this type of information associated with a credential-bearer is included on, for example, a paper credential itself.

In some embodiments, the privilege database 222 can be a relational database (e.g., a relational database system) configured to communicate based on a query language such as structured query language (SQL), another relational database system, a series of digital files, a series of digital tables, and/or another digital record which represents information associated with one or more individuals, one or more credentials, one or more domains, and/or one or more privileges. In some embodiments, the privilege database 222 can be a computer server including a set of digital records as described above and hardware and/or software for executing at least a portion of an authentication operation.

Figure 3:
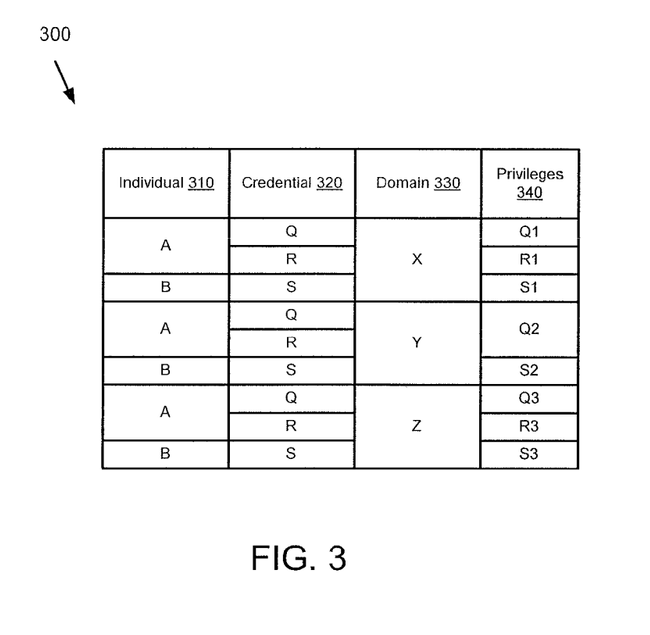
FIG. 3 is a diagram that illustrates a privilege data database, according to an embodiment.

FIG. 3 is a diagram that illustrates a privilege data database 300, according to an embodiment. In some embodiments, the privilege database 300 includes data entries stored in column entries and row entries. In some embodiments, the privilege database 300 includes columns individual 310, credential 320, domain 330, and privileges 340.

In some embodiments, the privilege database 300 can be defined based on a set of digital records representing privilege and authentication information. For example, in some embodiments, the privilege database 300 can be a relational database system based on a query language such as Structured Query Language (SQL), another relational database system, one or more digital files, one or more spreadsheet files, or another data storage repository.

In some embodiments, the column individual 310 includes row entries containing text associated with the identity an individual (e.g., an employee name, a customer ID number). In some embodiments, the column credential 320 can include row entries containing text associated with one or more credentials (e.g., a credential description, a credential serial number, a credential ID number). In some embodiments, the database can be configured to include one or more row entries in the column domain 330 containing text associated with the identity of a domain (e.g., a company name, an employer name, a building name). In some embodiments, the database can be configured to include one or more row entries in the column privileges 340 containing text associated with a privilege (e.g., a privilege allowing access to a particular door or physical location, a privilege allowing access to information associated with a bank account, a privilege granting authority to release funds associated with a bank account, a privilege allowing checkout of materials from a library, etc.).

In some embodiments, the privilege database 300 can be included in a computerized device (not shown). In some embodiments, the privilege database 300 can configured to receive and process privilege data requests based at least in part on a specified value for one or more of the columns individual 310, credential 320, domain 330, and/or privileges 340. For example, a processing device such as a terminal device can determine that individual A (column 310) can have privileges Q2 (column 340) associated with domain Y (column 330) based on an authentication process related to credential Q (column 320). The authentication process can be based on credential data received from credential Q.

Figure 4:
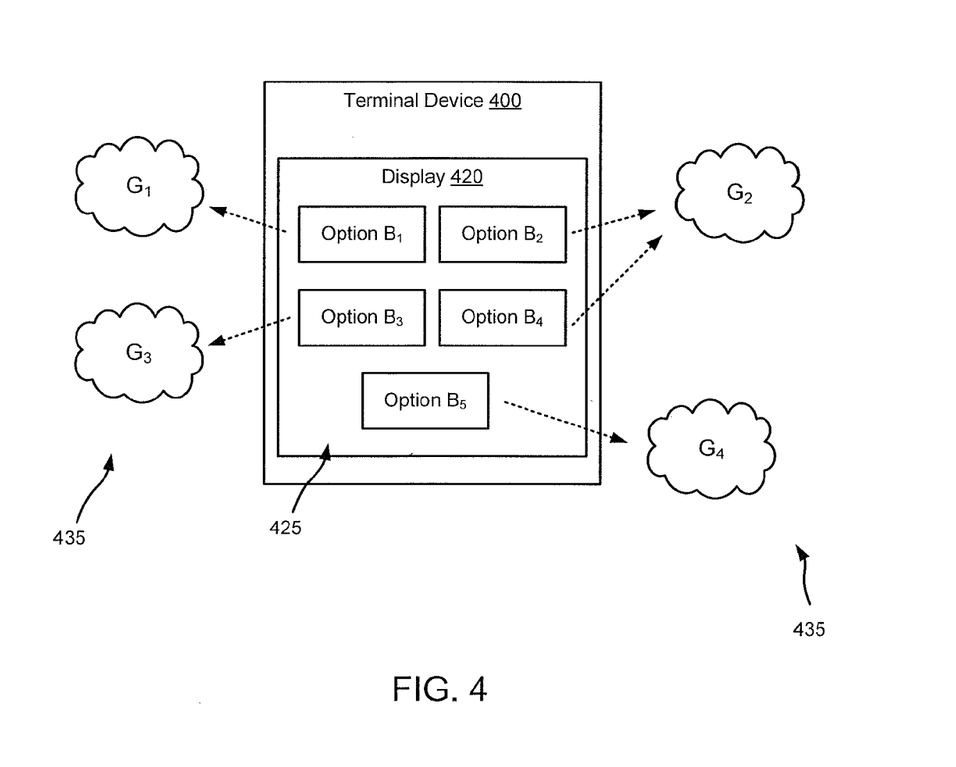
FIG. 4 is a schematic block diagram that illustrates a terminal device, according to an embodiment.

FIG. 4 is a schematic block diagram that illustrates a terminal device 400, according to an embodiment. As shown in FIG. 4, a terminal device 400 (e.g., a computerized device, a computer kiosk) can include a display 420 (e.g., a monitor, a touch-screen display). The display 420 can be configured to display several transaction options 425 (shown as transaction options $B_1$ through $B_5$). In some embodiments, the transaction options 425 can be associated with (e.g., can define) an interface (e.g., a graphical user interface).

In some embodiments, the transaction options 425 can be, for example, virtual buttons or actual buttons included in the terminal device 400. Although not shown, in some embodiments, the terminal device 400 can be configured to provide one or more transaction options to, for example, an individual via a mechanism (e.g., a light indicator) other than, or in addition to the display 420.

As shown in FIG. 4, each of the transaction options $B_1$ through $B_5$ is associated with at least one of domains $G_1$ through $G_4$ (collectively can be referred to as domains 435). For example, transaction option $B_2$ and transaction option $B_4$ are associated with domain $G_2$ as illustrated by the dashed arrows. Also, transaction option $B_1$ is associated with domain $G_1$.

The transaction options 425 shown in FIG. 4 can be configured to trigger execution of a transaction (or an application associated with a transaction) related to one or more of the domains 435 when selected (e.g., actuated). For example, transaction option $B_1$, which is associated with domain $G_1$, can be configured to trigger execution of an application associated with transfer of funds associated with domain $G_1$ when transaction option $B_1$ is selected by an individual. In some embodiments, one or more of the transaction options 425 can be configured to trigger a transaction related to an account balance, a purchase of an item, access to a building, access to a government record, etc.

In some embodiments, an individual can be permitted to access one or more of the transaction options 425 only after an authenticity of a credential possessed by the individual has been determined and/or the identity of the individual has been authenticated (during an authentication process). Accordingly only certain transaction may be triggered by the individual based on the authentication process. Although not shown, in some embodiments, only a subset of the transaction options 425 may be displayed on the display 420 based on a credential and/or an identity of an individual.

Although not shown, in some embodiments, the terminal device 400 can be configured to communicate (e.g., exchange data) with any number of one or more of the domains 435, for example, via a wired network and/or a wireless network. In some embodiments, an individual (not shown) can select, for example, transaction option $B_1$ via an input device (e.g., a touch screen display, a computer mouse, a computer keyboard, a keypad) associated with (e.g., in communication with via wired or wireless link to) the terminal device 400.

In some embodiments, the terminal device 400 can be configured to send and/or receive various type of transaction-related information associated with a transaction initiated by an individual via one or more of the transaction options 425. In some embodiments, the transaction-related information can be transferred between the terminal device 400 and one or more of the domains 425. The transaction-related information can be received by the terminal device 400 before a transaction, during a transaction, and/or after the transaction has been initiated.

In some embodiments, the transaction-related information can be used to trigger the transaction and/or enable the transaction to be initiated. In some embodiments, credential data received from a credential and/or supplemental authentication information can be used as transaction-related information. For example, credential data that is received from a credential before a transaction is initiated can be used during a transaction to facilitate the transaction. In some embodiments, transaction-related information can be configured to facilitate execution or completion of a transaction. In some embodiments, transaction-related information can be retrieved and communicated to an individual after a transaction has been completed.

In some embodiments, input data solicited from an individual by the terminal device 400 can be used as transaction-related information. In other words, input data from an individual can be in connection with a transaction. In some embodiments, one or more devices (not shown) associated with (e.g., included within) one or more of the domains 435 can be configured to solicit input data from the individual during a transaction. For example, a transaction (or an application associated with a transaction) related to domain $G_3$ can be initiated in response to transaction option $B_3$ being selected by an individual. A request for input data (e.g., transaction-related information such as an account number or a date range) can be defined at the domain $G_3$ and communicated to the individual via the terminal device 400. In other words, the individual can be prompted to enter input data. In response, the individual can enter information at the terminal device 400 that can then be communicated to the domain $G_3$ via the terminal device 400. In some embodiments, transaction-related information can be displayed on the display 420 of the terminal device 400.

Figure 5:
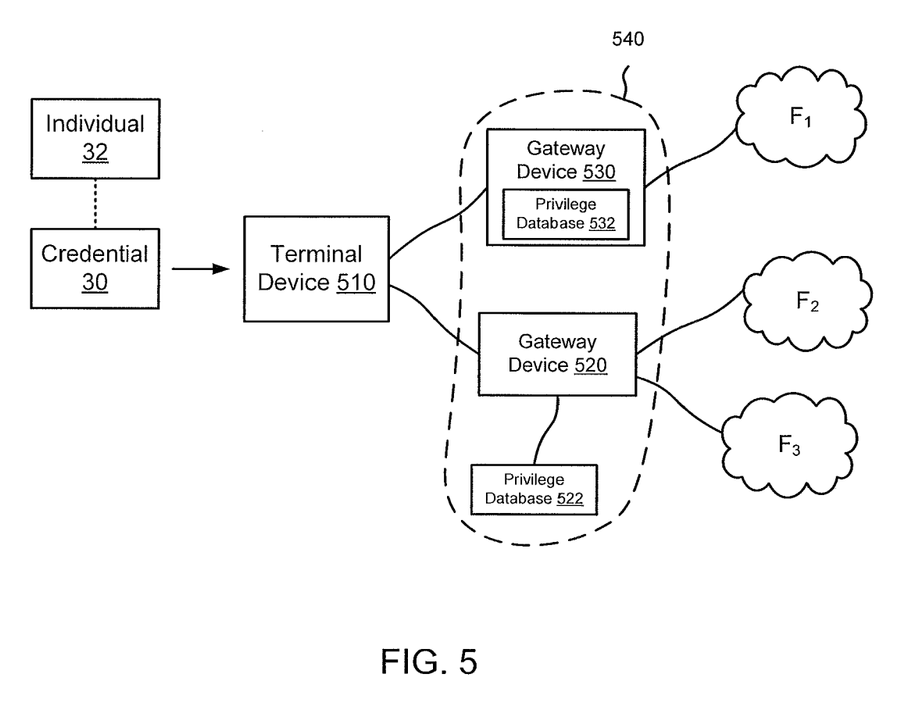
FIG. 5 is a schematic block diagram that illustrates multiple gateway devices associated with multiple domains, according to an embodiment.

FIG. 5 is a schematic block diagram that illustrates multiple gateway devices associated with multiple domains, according to an embodiment. Specifically, FIG. 5 illustrates gateway device 530 in communication with domain $F_1$, and gateway device 520 in communication with domain $F_2$ and domain $F_3$. In some embodiments, the gateway device 520 and/or gateway device 530 can be configured to communicate via a wireless link and/or a wired link. The gateway device 520 and/or the gateway device 530 are configured to communicate with the terminal device 510.

As shown in FIG. 5, the gateway device 530 includes a privilege database 532. The privilege database 532 can be stored in a local memory (not shown) of the gateway device 530. As shown in FIG. 5, the gateway device 520 is in communication with a privilege database 522 that is not disposed within the gateway device 520. In other words, the privilege database 522 can be remote database. Gateway device 520 and gateway device 530 can be collectively referred to as gateway devices 540. For example, the gateway device 530 can be configured to retrieve privilege data associated with an individual 32 from the privilege database 522 based on credential data from the credential 30.

In some embodiments, the gateway devices 540 can be associated with (e.g., controlled by, pertains to, is owned by) a third party (not shown) such as an information provider or data clearinghouse. In some embodiments, the terminal device 510 can be also be associated with (e.g., controlled by) the third party. Although not shown, in some embodiments, multiple gateway devices can be configured to communicate with a single domain.

As shown in FIG. 5, one or more of the gateway devices 540 can be configured to receive credential data from a credential 30. For example, gateway device 530 can be configured to receive credential data from the credential 30 via the terminal device 510 and/or can be configured to communicate transaction-related information with the terminal device 510. The gateway device 530 can be configured to exchange transaction-related information (e.g., an account number, a bank account balance, etc.) with, for example, domain $F_1$. In some embodiments, the gateway device 530 can be configured to initiate a transaction at least in part by sending the credential data and/or transaction execution information to the domain $F_1$.

Figure 6:
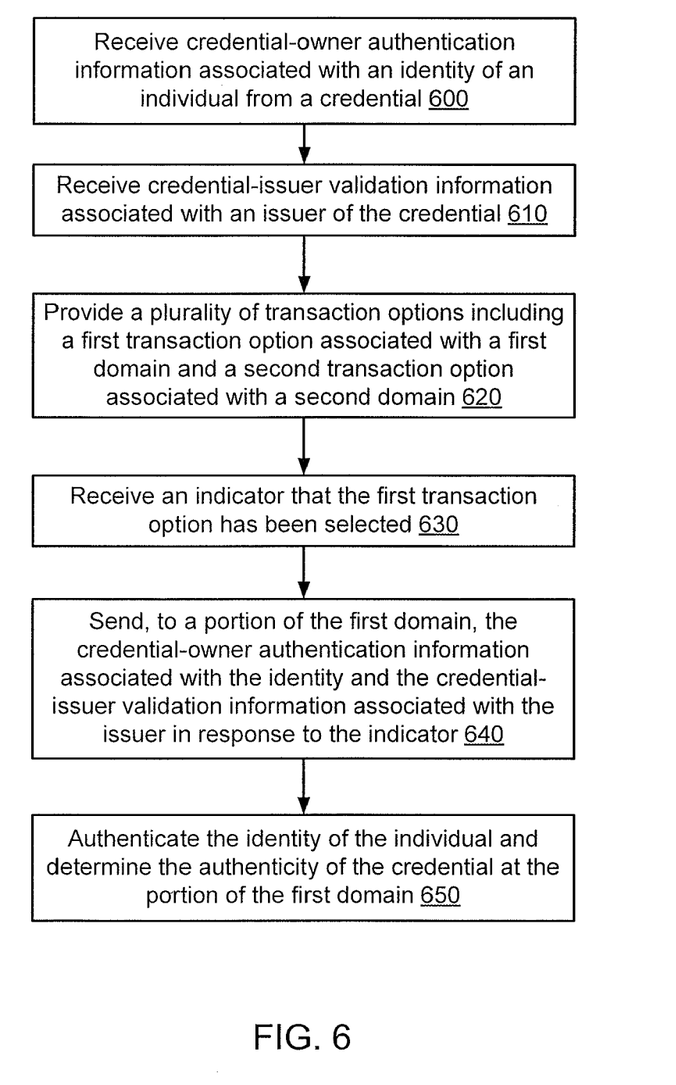
FIG. 6 is a flow chart that illustrates a method for authenticating an individual and a credential, according to an embodiment.

FIG. 6 is a flow chart that illustrates a method for authenticating an individual and a credential, according to an embodiment. As shown in FIG. 6, credential-owner authentication information associated with an identity of an individual is received from a credential at 600. In some embodiments, the credential-owner authentication information can be a digital certificate. In some embodiments, the credential can be a card including, for example, an RFID microchip. In some embodiments, the credential-owner authentication information can be received at a terminal device, such as a contactless card reader. In some embodiments, the credential can be configured to transmit credential-owner authentication information associated with the identity of the individual to the terminal device (e.g., the contactless card reader) via an emitted radio signal.

In some embodiments, an individual can be authenticated for purposes of allowing access to a plurality of financial transactions at a computerized bank kiosk equipped with a touch screen display based on the credential-owner authentication information. A contactless card reader can be coupled to and configured to transmit information to the computerized kiosk over a wired connection. The credential-owner authentication information can be received at the contactless card reader when the credential is positioned within a specified physical proximity of the contactless card reader terminal device.

Credential-issuer validation information associated with an issuer of the credential is received at 610. In some embodiments, the credential-issuer validation information can be a digital certificate. The credential-issuer validation information can be received at, for example, a contactless card reader when the individual swipes the credential at a terminal device. In some embodiments, the credential can be configured to transmit the credential-issuer validation information associated with an issuer of the credential by emitting a radio frequency signal.

A plurality of transaction options including a first transaction option associated with a first domain and a second transaction option associated with a second domain can be provided at 620. In some embodiments, the transaction options can be provided to an individual. In some embodiments, the first transaction option can be a financial transaction option (such as a balance inquiry) associated with a first bank account associated with a first financial institution. The second transaction option can be a financial transaction option (such as a cash withdrawal) associated with a second bank account associated with a second financial institution. The first financial institution and the second financial institution can be independent institutions. In some embodiments, the first transaction option and the second transaction option can be provided to the individual via a display included in a terminal device.

An indicator that the first transaction option has been selected is received at 630. In some embodiments, a terminal device can be configured to receive the indicator that the first transaction option has been selected by the individual.

The credential-owner authentication information associated with the identity and the issuer validation information associated with the issuer is sent to a portion of the first domain in response to the indicator at 640. The credential-owner authentication information and the credential-issuer validation information can collectively be referred to as credential data. The credential data can be sent from a terminal device (where this information is received) to a processing device within the first domain. In some embodiments, the credential data can be sent in response to a request from the first domain. In some embodiments, the credential data can be sent in response to a portion of a transaction being executed at the terminal device.

The identity of the individual is authenticated and the authenticity of the credential is determined at the portion of the first domain at 650. In some embodiments, the authenticity can be determined based on the credential data. In some embodiments, a remote computer network associated with the first domain can be configured to receive the credential data. The remote computer network can be configured to execute a comparison between the credential-owner authentication information associated with the identity of the individual and stored identity information (either on the credential or within the first domain, or both) associated with the individual to determine the authenticity of the individual. The remote computer network can also be configured to execute a comparison between the credential-issuer validation information associated with the issuer of the credential and stored valid credential-issuer information to determine the authenticity of the credential.

Figure 7:
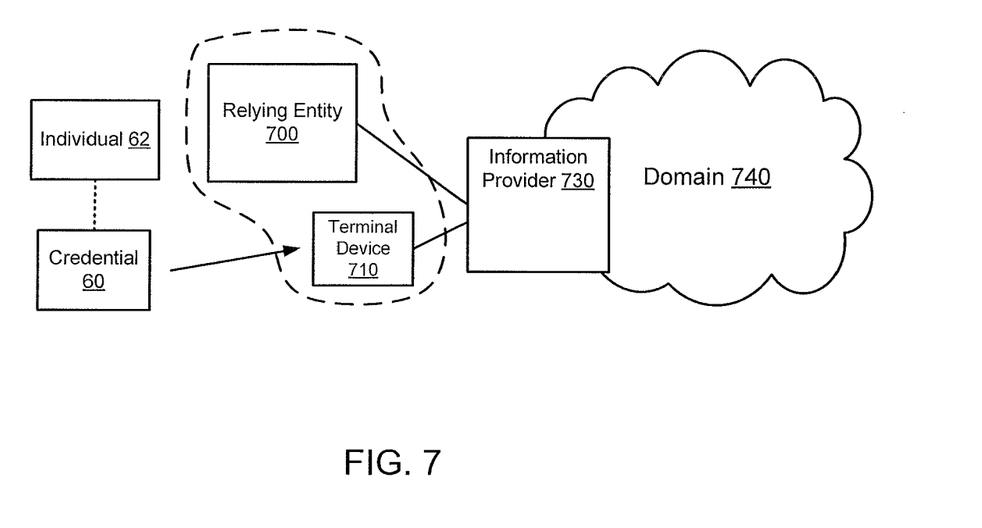
FIG. 7 is a schematic block diagram that illustrates a relying entity and a terminal device that are configured to communicate with an information provider, according to an embodiment.

FIG. 7 is a schematic block diagram that illustrates a relying entity 700 and a terminal device 710 that are configured to communicate with an information provider 730, according to an embodiment. In some embodiments, the relying entity 700 can be a retail store, an age-restricted establishment, etc. In some embodiments, information provider 730 can be, for example, a data warehouse. Additionally, FIG. 7 illustrates an information provider 730 configured to communicate with a domain 740. In some embodiments, the relying entity 700, the terminal device 710, the information provider 730, and the domain 740 can be configured to communicate via a wired or wireless link. In some embodiments, the information provider 730 can be included in (e.g., can be a component part of) the domain 740. Although not shown, in some embodiments, the relying entity 700 can be configured to communicate with the information provider 730 through the terminal device 710. In some embodiments, the terminal device can be owned by (e.g., controlled by) the information provider 730.

In this embodiment, authentication based on a credential 60 is required before transmission of confidential information (e.g., personally identifiable information) associated with an individual 62 to the relying entity 700 is permitted. For example, a terminal device 710 can be configured to require authentication of an identity of the individual 62 and/or determination of an authenticity of the credential 60 before confidential information associated with the individual 62 (e.g., a date of birth) is sent by an information provider 730 to the relying entity 700. In some embodiments, explicit approval by the individual 62 must be acquired before sending of the confidential information to the relying entity 700 is permitted. More details related to authorization of data transmissions related to confidential information are set forth in patent application Ser. No. 12/268,065, filed Nov. 10, 2008, entitled "Methods and Apparatus Related to Transmission of Confidential Information to a Relying Entity," now U.S. Pat. No. 8,464,313, which is incorporated herein by reference in its entirety. Although not shown, in some embodiments the individual 62 can be a referred to as a subject entity and/or as a subject individual.

In addition, in some embodiments, the relying entity 700 can be a credential owner (similar to the individual 62) and can be, for example, granted access to the information provider 730 (e.g., access to confidential information maintained by the information provider 730 and associated with the individual 62) based on an authentication process (based on the credential associated with the relying entity 700).

In some embodiments, the terminal device 710, which can be associated with the relying entity 700 can be configured to define and send a request for confidential information associated with the individual 62 (e.g., age of the individual 62) to the information provider 730. For example, in some embodiments, the relying entity 710 can be a vendor and the terminal device 710 can be a kiosk at the vendor. After the information provider 730 receives the request for the confidential information from the terminal device 710, the information provider 730 can be configured to send to the terminal device 710 an authentication-triggering signal (also known as an initiation signal). The authentication-triggering signal can be configured to trigger (based on an instruction) the terminal device 710 to initiate an authentication operation based on credential data from the credential 60. In some embodiments, the terminal device 710 can be configured to receive the authentication-triggering signal from the information provider 730. In some embodiments, the request for confidential information can be defined based on a pre-defined query and/or a standard query. More details related to predefined queries and/or standard queries are set forth in patent application Ser. No. 12/268,065, now U.S. Pat. No. 8,464,313, which has been incorporated herein by reference in its entirety In some embodiments, the terminal device 710 can be configured to display a prompt (e.g., via a display included in the terminal device 710, not shown) that requests input of supplemental authentication information (e.g., a PIN, biometric information) associated with the individual 62. In some embodiments, the terminal device 710 can be configured to receive a signal containing the requested supplemental authentication information via an input device (e.g., a touch screen, a computer mouse and/or keyboard, a keypad, a thumbprint scanner, a retina scanner, etc.) associated with (e.g. in communication with, included in) the terminal device 710. In some embodiments, the terminal device 710 can be configured to compare the supplemental authentication information to credential-owner authentication information (such as a PIN number and/or biometric information) from the credential 60 to authenticate the identity of the individual 62.

In some embodiments, the terminal device 710 can be configured to send a signal indicating the success or failure of the authentication operation to the information provider 730. In some embodiments, the signal can be referred to as a success/failure signal. In some embodiments, the information provider 730 can be configured to receive the success/failure signal. If the value of the received success/failure signal includes information associated with a successful identity validation, the information provider 730 can be configured to send the confidential information to the relying entity 700 for use in the transaction. In some embodiments, the information provider 730 can be configured to transfer confidential information in response to a successful authentication process and approval of the transfer of the confidential information by the individual 62. In some embodiments, the terminal device 710 can be configured to display a message indicating the success or failure of the authentication operation.

Although not shown, in some embodiments, the terminal device 710 can be configured to communicate (e.g., communicate via a network) with an identity database associated with the individual 62. The individual 62 can access and select an identity (e.g., an alias) from the identity database via the terminal device 710. The individual 62 can also trigger sending of the selected identity to the relying entity 700 from the identity database via the terminal device 710. In other words, the individual 62 can assert an identity to the relying entity 700 via the terminal device 710. The individual 62 can maintain several aliases in the identity database. This type of architecture can enable the individual 62 to use, for example, a specified alias (e.g., an alias associated with a specified e-mail address and/or mailing address) when transacting with an unknown vendor (e.g., an unknown relying entity) and another alias (e.g., an alias with a different email address and/or different mailing address) when transacting with a trusted vendor (e.g., a trusted/ known relying entity). In this way, for example, the individual can prevent, or substantially prevent, possible spam from the unknown vendor from reaching, for example, a specified (e.g., a preferred) email address, which may be shared only with trusted vendors.

Figure 8:
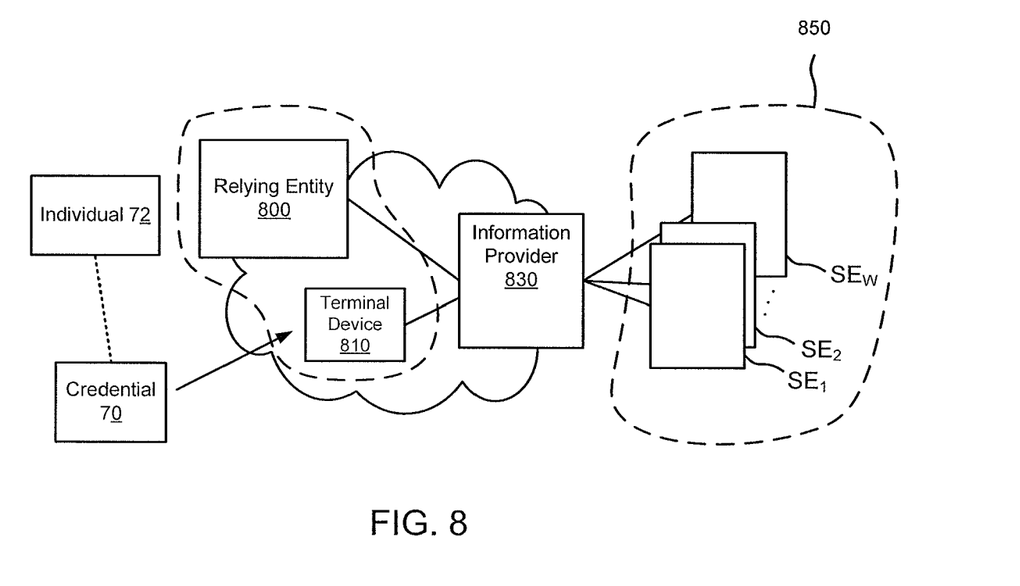
FIG. 8 is a schematic block diagram that illustrates an information provider in communication with multiple information sources, according to an embodiment.

FIG. 8 is a schematic block diagram that illustrates an information provider 830 in communication with multiple information sources 850, according to an embodiment. The information sources 850 include information sources $SE_1$ through $SE_W$. The information sources 850 can include information associated with (e.g., pertaining to) an individual 72. The information sources 850 can be, for example, a credit card company database, a government public records database, etc.

In some embodiments, the information provider 830 can be configured to receive a request for confidential information associated with the individual 72. The request can be defined by, for example, a relying entity 800. If one or more of the information sources 850 can fulfill the request for the confidential information (referred to as potential information sources 850), the information provider 830 can be configured to present the potential information sources 850 to the individual 72 via the terminal device 810. The eligible information sources 850 can be provided in response to the request for the confidential information. The terminal device 810 can be configured so that the individual 72 can select one or more of the potential information sources 850 via the terminal device 810 only after an authentication operation based on a credential 70. In response to the selection, the request for the confidential information can be forwarded by the information provider 830 to the selected information source 850. This request may contain authentication information sufficient to demonstrate the authorization of the individual to release the information. The selected information source 850 can be configured to fulfill the request for the confidential information by sending the confidential information directly to the relying entity 800. In some embodiments, the confidential information can be sent to the relying entity 800 via the information provider 830. More details related to selection of an information provider are set forth in patent application Ser. No. 12/268,065, now U.S. Pat. No. 8,464,313, which has been incorporated herein by reference in its entirety.

Some embodiments described herein relate to a computer storage product with a computer-readable medium (also can be referred to as a processor-readable medium) having instructions or computer code thereon for performing various computer-implemented operations. The media and computer code (also can be referred to as code) may be those designed and constructed for a specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave processing systems; and hardware devices that are specially configured to store and execute program code, such as Application-Specific Integrated Circuits (ASICs), Programmable Logic Devices (PLDs), and Read-Only Memory (ROM) and Random-Access Memory devices. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described. For example, multiple credentials can be used to authenticate an identity of an individual at a terminal device. In some embodiments, a credential can have different credential data associated with terminal devices based on different platforms.

What is claimed is:

1. A method, comprising:
receiving, based on a credential and at a terminal device outside a first domain and a second domain mutually exclusive from the first domain, a credential-owner authentication information associated with (1) an identity of a subject entity, and (2) a request for entity-specific information associated with the subject entity from a relying entity within the first domain, the first domain being at least one of a physical domain or a virtual domain;
authenticating the identity of the subject entity based on the credential-owner authentication information; and
sending, based on the request for entity-specific information and in response to the authenticating, an indication of the identity to an information source of the second domain to instruct the information source of the second domain to send to the relying entity of the first domain the entity-specific information associated with the subject entity based on the indication of the identity.

2. The method of claim 1, further comprising:
receiving an issuer validation information associated with an issuer of the credential, the authenticating includes authenticating the identity of the subject entity based on the credential-owner authentication information and the issuer validation information.

3. The method of claim 1, wherein the sending includes sending the indication of the identity to the information source to cause the information source to retrieve, from a portion of a distributed privilege database within the second domain, an indication of a set of privileges associated with the second domain based on the authenticating.

4. The method of claim 1, wherein the credential is a token.

5. The method of claim 1, wherein the credential is one of a smart-card or a mobile telephone.

6. The method of claim 1, wherein the credential is included in an electronic processing device.

7. The method of claim 1, wherein the request is defined based on a standard query.

8. The method of claim 1, wherein the request is defined based on a transaction type associated with the relying entity.

9. The method of claim 1, wherein the request for entity-specific information is a targeted request for data associated with confidential information of the subject entity,
the sending includes sending the indication of the identity to the information source of the second domain to instruct the information source of the second domain to send the entity-specific information based on the targeted request.

10. A non-transitory processor-readable medium storing code representing instructions to be executed by a processor, the code comprising code to cause the processor to:
authenticate, at a computing device outside a first domain, an identity of a subject entity based on a credential-owner authentication information associated with a credential and the identity;

define a request for entity-specific information associated with the subject entity in response to the authenticating;

send the request and an indication of the identity to the first domain to cause the first domain to retrieve a privilege value associated with the first domain and based on the authenticating; and receive an indicator, from the first domain and in response to the request, that sending of the entity-specific information to a relying entity of a second domain has been approved based on the privilege value.

11. The non-transitory processor-readable medium of claim 10, wherein the code to cause the processor to authenticate the identity of the subject entity includes code to cause the processor to authenticate the identity of the subject entity based on the credential-owner authentication information and a credential-issuer validation information associated with the credential.

12. The non-transitory processor-readable medium of claim 10, wherein the request is defined based on a transaction type associated with the relying entity.

13. The non-transitory processor-readable medium of claim 10, wherein the credential is a card.

14. The non-transitory processor-readable medium of claim 10, wherein the credential is included in an electronic processing device.

15. The non-transitory processor-readable medium of claim 10, wherein the first domain is at least one of a physical domain or a virtual domain.

16. The non-transitory processor-readable medium of claim 10, wherein the request is defined based on a standard query.

17. The non-transitory processor-readable medium of claim 10, wherein the indicator is triggered by the subject entity.

18. An apparatus, comprising:

an information provider implemented in at least one of a memory or a processing device, the information provider configured to receive, based on a credential and via a terminal device different from a relying entity within at least one of a physical domain or a virtual domain and an information source, at least one of a credential-owner authentication information or a credential-owner-provided unique information, the at least one of the credential-owner authentication information or the credential-owner-provided unique information being associated with (1) an identity of a subject entity, and (2) a request from the relying entity for entity-specific information associated with the subject entity, the information provider configured to authenticate the identity of the subject entity based on at least one of the credential-owner authentication information or the credential-owner-provided unique information, the information provider configured to send, based on the request for entity-specific information and in response to authenticating the identity, at least one of an indication of the identity or the credential-owner-provided unique information to the information source to instruct the information source to send to the relying entity the entity-specific information associated with the subject entity based on at least one of the indication of the identity or the credential-owner-provided unique information.

19. The apparatus of claim 18, wherein the information provider is configured to send the indication of the identity to the information source to cause the information source to retrieve, from a portion of a distributed privilege database associated with the information source, a set of privileges associated with the entity-specific information based on the indication of the identity.

20. The apparatus of claim 18, wherein the information provider is configured to receive an issuer validation information associated with an issuer of the credential, the information provider configured to authenticate the identity of the subject entity based on the credential-owner authentication information and the issuer validation information.

21. The apparatus of claim 18, wherein the request is defined based on a transaction type associated with the relying entity.

22. The apparatus of claim 18, wherein the request for entity-specific information is a targeted request for data associated with confidential information of the subject entity, the information provider configured to send at least one of the credential-owner authentication information or the credential-owner-provided unique information to the information source to instruct the information source to send the entity-specific information based on the targeted request.

* * * * *